United States Patent
Gilmore et al.

(10) Patent No.: US 11,338,711 B1
(45) Date of Patent: May 24, 2022

(54) LATERAL VIBRATION ISOLATOR MECHANISM FOR VEHICLE SEAT BACK

(71) Applicant: Toyota Motor Engineering & Manufacturing North America, inc., Plano, TX (US)

(72) Inventors: Paul A Gilmore, Ann Arbor, MI (US); Umesh Gandhi, Farmington Hills, MI (US); Ryohei Tsuruta, Ann Arbor, MI (US); Brian J Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/205,980

(22) Filed: Mar. 18, 2021

(51) Int. Cl.
*B60N 2/54* (2006.01)
*B60N 2/30* (2006.01)

(52) U.S. Cl.
CPC ............ *B60N 2/544* (2013.01); *B60N 2/3011* (2013.01)

(58) Field of Classification Search
CPC .... B60N 2/544; B60N 2/3011; B60N 2/3004; B60N 2/3009; B60N 2/3013
USPC .................................................. 297/452.18
See application file for complete search history.

(56) References Cited

U.S. PATENT DOCUMENTS

| | | | | |
|---|---|---|---|---|
| 3,275,372 | A * | 9/1966 | Radke | B60N 2/22 297/285 |
| 3,761,045 | A * | 9/1973 | Sturhan | B60N 2/505 248/567 |
| 6,505,890 | B2 * | 1/2003 | Riley | B60R 21/272 297/452.2 |
| 6,517,060 | B1 | 2/2003 | Kemeny | |
| 9,573,501 | B2 | 2/2017 | Shiromura et al. | |
| 10,371,229 | B2 | 8/2019 | Gandhi et al. | |
| 10,677,310 | B2 | 6/2020 | Gandhi et al. | |
| 2018/0105082 | A1 * | 4/2018 | Knox | B60N 2/505 |
| 2018/0178690 | A1 * | 6/2018 | Castillo | B60N 2/002 |
| 2019/0186587 | A1 * | 6/2019 | Gandhi | F16F 15/06 |
| 2019/0186588 | A1 * | 6/2019 | Gandhi | F16F 15/002 |
| 2019/0186589 | A1 | 6/2019 | Gandhi et al. | |

* cited by examiner

*Primary Examiner* — Mark R Wendell
(74) *Attorney, Agent, or Firm* — Haynes and Boone, LLP (57) ABSTRACT

A vehicle seat includes a first seat component such as a seat pan or seat frame, and a second seat component such as a seat back. The first seat component is rotatably coupled to the second seat component by a rotatable coupling, and a laterally oriented vibration isolator is positioned between the first seat component and the second seat component at the rotatable coupling. Transmission of vibration from the first seat component to the second seat component through the rotatable coupling is suppressed by the vibration isolator. In some cases, the vibration isolator is a quazi-zero-stiffness (QZS) isolator.

18 Claims, 10 Drawing Sheets

LATERAL VIBRATION ISOLATOR MECHANISM FOR VEHICLE SEAT BACK

TECHNICAL FIELD

The subject matter described herein relates to a lateral vibration isolator mechanism for vehicle seat backs. This lateral vibration isolator has particular but not exclusive utility for reducing seat vibration in cars, trucks, and vans.

BACKGROUND

Seats in a vehicle (e.g., a car, truck, or van) often include seat pan or seat cushion pan attached to a seat frame, which attaches to a pair of sliding rails, which in turn are attached to the vehicle floor. To limit the transmission of vibration between the vehicle floor and the seat, vibration isolators may be placed between the sliding rails and the seat frame, or between the sliding rails and the floor. For example, linear spring vibration isolators may be used for this purpose. However, vibrations may still be felt in the seat base (e.g., the seat pan and/or seat frame), and may be transferred from the seat base to the seat back. Because the seat back is taller than other seat components, any lateral (e.g., left-right) vibrations in the seat base will result in larger motions at the top of the seat back than at its bottom. Thus, it can be said that the seat back amplifies vibrations such that, for example, a passenger's head feels more vibration than the same passenger's lower back. Accordingly, a need exists for vibration isolation mechanisms to limit vibration of the seat back.

The information included in this Background section of the specification, including any references cited herein and any description or discussion thereof, is included for technical reference purposes only and is not to be regarded as subject matter by which the scope of the disclosure is to be bound.

SUMMARY

To reduce vibration transmission any given axis, a stacked disk isolator or quasi-zero-stiffness (QZS) isolator may be employed. By suitable selection of spring design parameters, a spring stack may be designed to produce a quasi-zero/negative stiffness response to a range of forces applied to the spring stack. A quasi-zero-stiffness response occurs when the spring stack compresses or uncompresses very easily in response to changes in applied force, as though it had a stiffness or spring constant close to zero. For example, when subjected to a force in this design range of forces (e.g., when it is compressed into its quasi-zero-stiffness range), the spring stack may be deflected over a relatively wide range of values responsive to little or no increase in the applied force. Explained differently, when the spring stack is in its quasi-zero-stiffness range, it may not "push back" against compressive forces, but rather simply absorb them by compressing or "deflecting". Under these conditions, it has been found that transmission of vibrations from a first element (such as a vehicle seat bottom) to a second element (for example, a vehicle back) may be eliminated or substantially attenuated.

In some cases, it may be desirable to apply an axial pre-load force on the spring stack sufficient for the stack to reach the quasi-zero/negative stiffness response range, so that the full benefit of the isolator can be realized. In addition, the spring will ideally be positioned between the seat back and the source of vibration.

The lateral vibration isolator disclosed herein has particular, but not exclusive, utility for cars, trucks, and vans. One general aspect includes a vehicle seat with a first seat component; a second seat component rotatably coupled to the first seat component by a rotatable coupling; and a laterally oriented vibration isolator positioned between the first seat component and the second seat component at the rotatable coupling, such that transmission of vibration from the first seat component to the second seat component through the rotatable coupling is suppressed.

Implementations may include one or more of the following features. In some embodiments, the first seat component is a seat pan or seat frame. In some embodiments, the second seat component is a seat back. In some embodiments, the laterally oriented vibration isolator is a quasi-zero-stiffness (QZS) vibration isolator. In some embodiments, the laterally oriented vibration isolator is rotatably coupled to the first seat component or the second seat component. In some embodiments, the laterally oriented vibration isolator further includes a threaded connection portion through which at least a portion of the bolt is threaded, and where rotation of the bolt through the threaded connection portion compresses or uncompresses the laterally oriented vibration isolator, thereby increasing or decreasing a pre-load force on the laterally oriented vibration isolator. In some embodiments, the pre-load force or degree of compression is selected such that the laterally oriented vibration isolator is in a quasi-zero-stiffness range. In some embodiments, the laterally oriented vibration isolator is a first laterally oriented vibration isolator, and where the vehicle seat further includes a second laterally oriented vibration isolator positioned between the first seat component and the second seat component at the rotatable coupling. In some embodiments, the laterally oriented vibration isolator is a first laterally oriented vibration isolator, where the rotatable coupling is a first rotatable coupling, and where the vehicle seat further includes a second rotatable coupling between the first seat component and the second seat component, where a second laterally oriented vibration isolator is positioned between the first seat component and the second seat component at the second rotatable coupling, such that transmission of lateral vibration from the first seat component to the second seat component through the second rotational coupling is suppressed. In some embodiments, the vehicle seat further includes a third laterally oriented vibration isolator positioned between the first seat component and the second seat component at the first rotatable coupling, and a fourth laterally oriented vibration isolator positioned between the first seat component and the second seat component at the second rotatable coupling.

One general aspect includes a vehicle with a vehicle seat including; a seat base, where the seat base includes a seat pan or a seat frame; a seat frame; a seat back rotatably coupled to the seat pan or the seat frame by a rotatable coupling; and a vibration isolator positioned between the seat base and the seat back at the rotatable coupling, such that transmission of vibration from the seat base to the seat back through the rotatable coupling is suppressed.

Implementations may include one or more of the following features. In some embodiments, the vibration isolator is a quasi-zero-stiffness (QZS) vibration isolator. In some embodiments, the vibration isolator is a quasi-zero-stiffness (QZS) vibration isolator, where the vibration isolator further includes a threaded connection portion through which at least a portion of the bolt is threaded, and where rotation of the bolt through the threaded connection portion compresses or uncompresses the vibration isolator, thereby increasing or decreasing a pre-load force on the vibration isolator. In some embodiments, the pre-load force or compression is selected such that the vibration isolator is in a quasi-zero-stiffness range. In some embodiments, the vibration isolator is a first vibration isolator, and the vehicle seat further includes a second vibration isolator positioned between the seat base and the seat back at the rotatable coupling. In some embodiments, the vibration isolator is a first vibration isolator, and the vehicle seat further includes a second rotatable coupling between the seat base and the seat back, where a second vibration isolator is positioned between the seat base and the seat back at the second rotatable coupling, such that transmission of vibration from the seat base to the seat back through the second rotational coupling is suppressed. In some embodiments, the vehicle further includes a third vibration isolator positioned between the seat base and the seat back at the first rotatable coupling, and a fourth vibration isolator positioned between the seat base and the seat back at the second rotatable coupling.

One general aspect includes a vehicle with a seat including: a seat base, where the seat base includes a seat pan or a seat frame; a seat frame; a seat back rotatably coupled to the seat pan or the seat frame by a rotatable coupling; a laterally oriented quasi-zero-stability vibration isolator positioned between the seat base and the seat back at the rotatable coupling; and a bolt coupling the vibration isolator to the seat base or the seat back, where the vibration isolator further includes a threaded connection portion through which at least a portion of the bolt is threaded, and where rotation of the bolt through the threaded connection portion compresses or uncompresses the vibration isolator, thereby increasing or decreasing a pre-load force on the laterally oriented vibration isolator.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the lateral vibration isolator, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

To reduce vibration transmission any given axis, a stacked disk isolator or quasi-zero-stiffness (QZS) isolator may be employed, which consists of a stack of flexible Belleville washers or disk spring washers arranged in stacks of alternating cones, separated by ring-shaped spacers positioned at the inner and outer edges of the washers. By suitable selection of spring design parameters, such a spring stack may be designed to produce a quasi-zero/negative stiffness response to a range of forces applied to the spring stack (i.e., when subjected to a force in this design range of forces, the spring stack may be deflected over a relatively wide range of values responsive to little or no increase in the applied force). Under these conditions, it has been found that transmission of vibrations from a first element (such as a vehicle seat bottom, seat frame, or seat back hinge) to a second element (for example, a vehicle back) may be eliminated or substantially attenuated.

In some cases, when a lateral QZS vibration isolator is positioned as to isolate the seat back from vibrations occurring in the seat pan or seat frame, the QZS isolator may be optimized if an axial pre-load force is applied to the spring stack, where the force is sufficient for the stack to reach the quasi-zero/negative stiffness response range. In such a pre-load configuration, the QZS vibration isolator is in its quasi-zero-stiffness response range even when no external forces (e.g., vibration forces) are applied to it. Thus, the full benefit of the QZS region can be applied to suppressing the transmission of vibration from the seat bottom (e.g., the seat pan or seat frame) to the seat back. The QZS vibration isolator will ideally be positioned between the seat back and the source of vibration, such as for example on the hinge connecting the seat back to the seat pan or seat frame. Since the amplitude of vibrations may be higher at the top of the seat back than at its base, any reduction in vibration at the bottom of the seat back will be felt more strongly for example at the level of a passenger's head.

The proposed arrangement will help improve the comfort of vehicle seats by reducing vibration transmitted upward into the seat back from the seat bottom. This design provides an improvement over existing vehicle seats because it permits a range of horizontal deflections over which no significant lateral forces are generated. The result is less transmission of vibration between the seat base (e.g., the seat pan and/or the seat frame) and the seat back, and thus a smoother ride for passengers.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the lateral vibration isolator. Certain features may be added, removed, or modified without departing from the spirit of the claimed subject matter.

Figure 1:
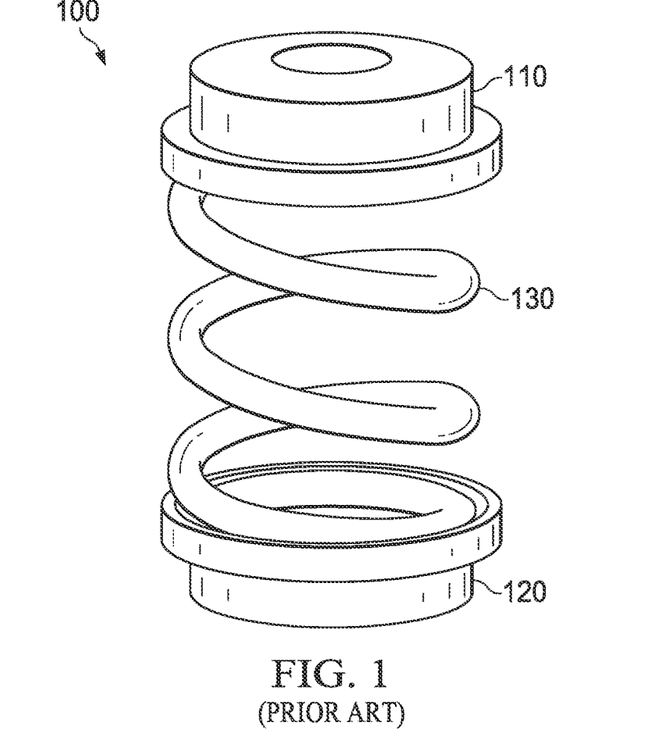
FIG. 1 is an exemplary representation of a conventional linear spring isolator, according to aspects of the present disclosure.

FIG. 1 is an exemplary representation of a conventional linear spring isolator 100, according to aspects of the present disclosure. The linear spring isolator 100 includes a top attachment portion 110 and bottom attachment portion 120, separated by a spring 130. The spring 130 may for example be a metallic spring which deflects (e.g., compresses or stretches) in a manner that is approximately linearly correlated to the amount of vertical force placed on the isolator 100. In an example, the linear spring isolator 100 may be placed between a vehicle seat and the vehicle floor, in an attempt to limit transmission of vibrations from the floor to the seat. In such a use case, the top attachment portion 110 may for example be bolted to the seat frame, while the bottom attachment portion 120 may for example be bolted to the vehicle floor, or to the top of a slide rail to which the seat is mounted. Such undamped linear spring isolators 100 provide limited vibration isolation and limited lateral stability and lateral load capacity.

Figure 2A:
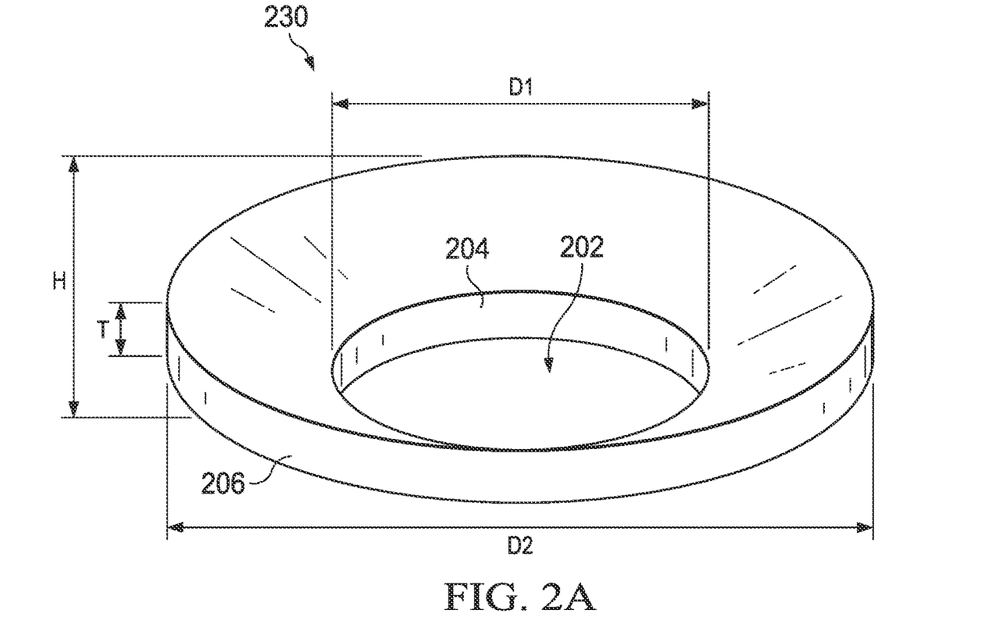
FIG. 2A is a perspective view of a ring-shaped or cone-shaped disk, Belleville washer, or disk spring washer, in accordance with aspects of the present disclosure.

FIG. 2A is a perspective view of a ring-shaped or cone-shaped disk 230, in also known as a Belleville washer or disk spring washer, in accordance with aspects of the present disclosure. The disk 230 may for example be made of rubber, or another elastic material capable of flexing and then returning to its original shape. The conical shape of the disk is formed because the inner edge 204 and the outer edge 206 of the disk 230 are separated vertically by a height H. The inner edge 204 forms a central opening 202 with a diameter D1, while the outer edge 206 of the disk 230 has a diameter D2. The material forming the spring disk or washer 230 has a thickness T.

Figure 2B:
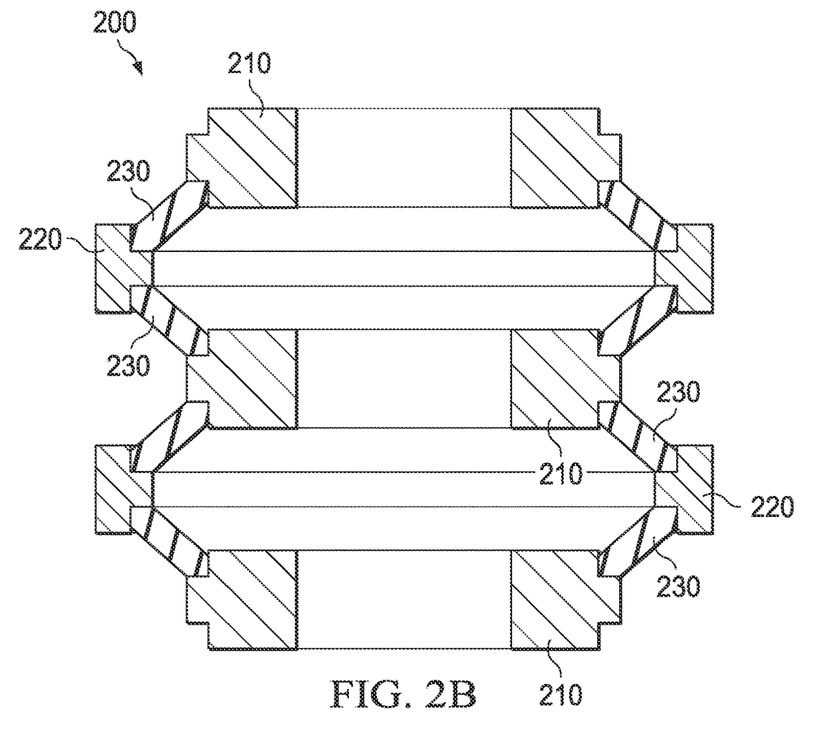
FIG. 2B is a side cross-sectional view of an exemplary quasi-zero-stability (QZS) vibration isolator, in accordance with aspects of the present disclosure.

FIG. 2B is a side cross-sectional view of an exemplary quasi-zero-stability (QZS) vibration isolator 200, in accordance with aspects of the present disclosure. The QZS isolator 200 includes a plurality of ring-shaped or cone-shaped rubber disks 230, also known as Belleville washers, disk spring washers, or spring disk washers. The disks 230 are separated by inner spacers 210 coupled to the inner edge of each spring disk washer 230 or each pair of spring disk washers 230. The spring disk washers 230 are also separated by outer spacers 220 coupled to the outer edge of each spring disk washer 230. The disks or Belleville washers 230 are stacked such that if two disks 230 are vertically adjacent to one another, then either their two outer edges 206 (See FIG. 1A) are coupled to the same outer spacer 220, or their inner edges 204 (See FIG. 1A) are coupled to the same inner spacer 210. Thus, the stack of disks or washers 230 forms a bellows shape that is capable of compressing vertically and then returning to its original shape.

The QZS vibration isolator 200 may include either an even or an odd number of spring disk washers 230. The spring disk washers 230 may be coupled to the spacers 210 and 220 by means of a friction fit or adhesive coupling, either or both of which may involve grooves, slots, or indentations in either the spacers 210, 220 or the spring disk washers 230, or any combination thereof.

Figure 2C:
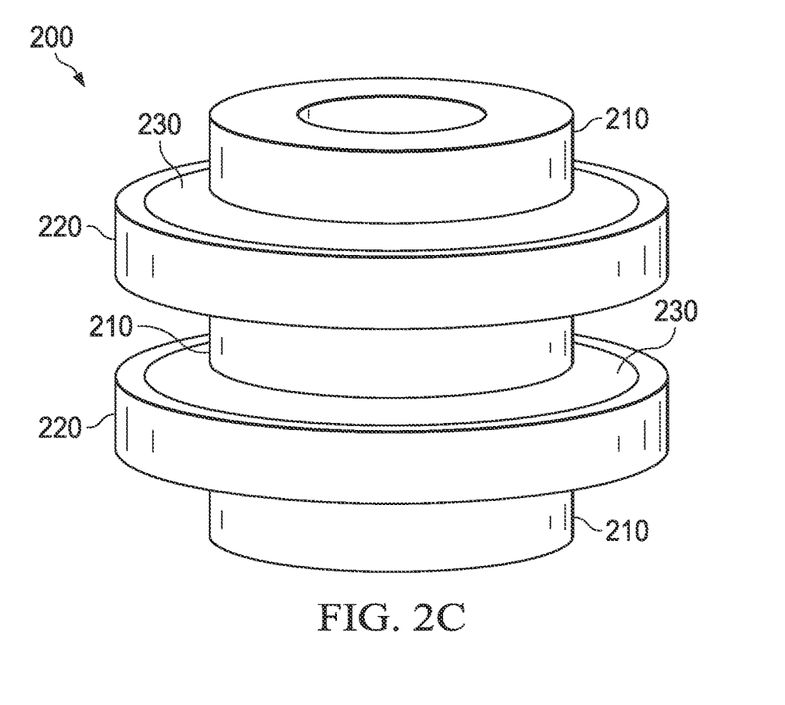
FIG. 2C is a perspective view of an exemplary QZS vibration isolator, in accordance with aspects of the present disclosure.

FIG. 2C is a perspective view of an exemplary QZS vibration isolator 200, in accordance with aspects of the present disclosure. Visible are the inner spacers 210, outer spacers 220, and disk spring washers 230.

Figure 3:
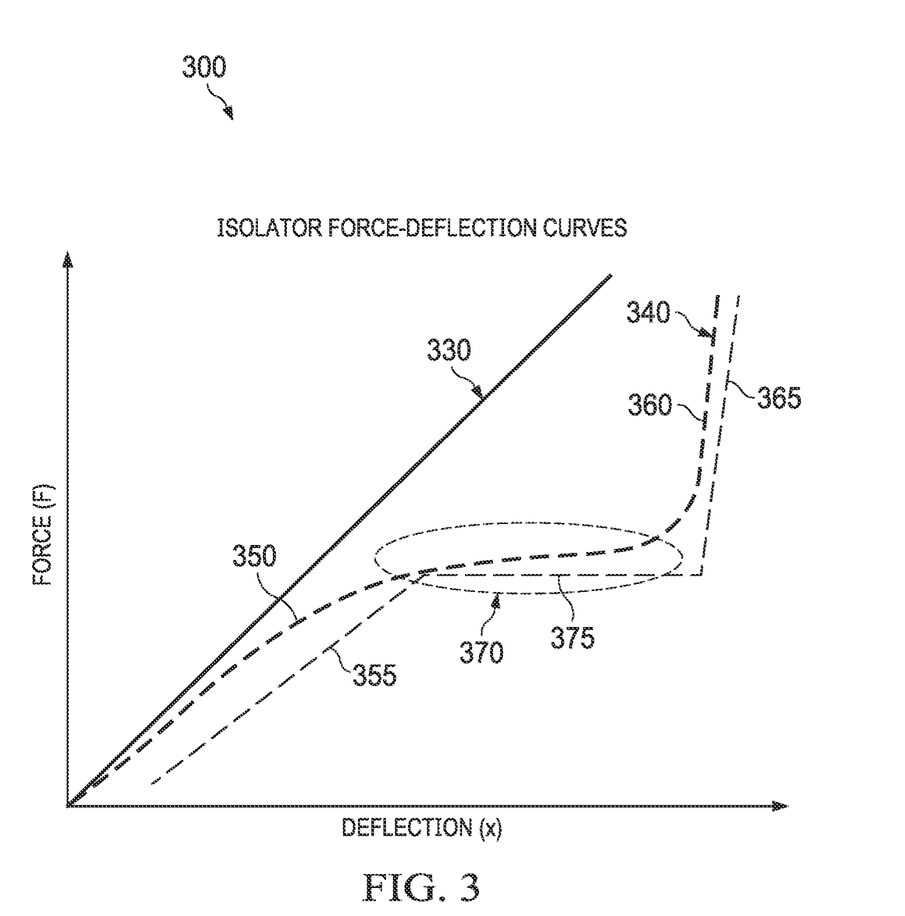
FIG. 3 shows a performance graph of an example linear spring isolator and an example QZS isolator, in accordance with aspects of the present disclosure.

FIG. 3 shows a performance graph 300 of an example linear spring isolator 330 and an example QZS isolator 340, in accordance with aspects of the present disclosure. The linear spring isolator curve 330 exhibits a linear or approximately linear relationship between an applied force F and a resulting deflection x of the spring. The slope of this line is the spring constant k of the spring, such that F=kx. The QZS isolator curve 340 exhibits a more complex relationship between the vertical force F placed on it and the resulting vertical deflection or compression x. This force-deflection relationship includes a first approximately linear region 350 and a second approximately linear region 360, separated by a quasi-zero-stiffness (QZS) region 370. Thus, the force-deflection relationship can be approximated as three straight line segments 355, 365, and 375.

Within the first approximately linear region 350, the slope of the curve 340 may be approximated as $F=k_1 x$, yielding the first line segment 355. For the QZS region, the slope can be approximated as zero, yielding the second line segment 375. For the second approximately linear region 360, the slope of the curve 340 Ny be approximated as $F=K_2 x$, yielding the third line segment 365.

In the quasi zero stiffness region 365 of the QZS isolator curve 340, small increases in downward force F on the QZS isolator result in disproportionately large increases in the deflection x or, alternatively, it can be said that large changes in the deflection x do not result in significant changes in the upward force F delivered by the isolator. As shown below, this force-deflection relationship 340 makes the QZS isolator more effective than the linear spring at damping or isolating vibrations.

Figure 4:
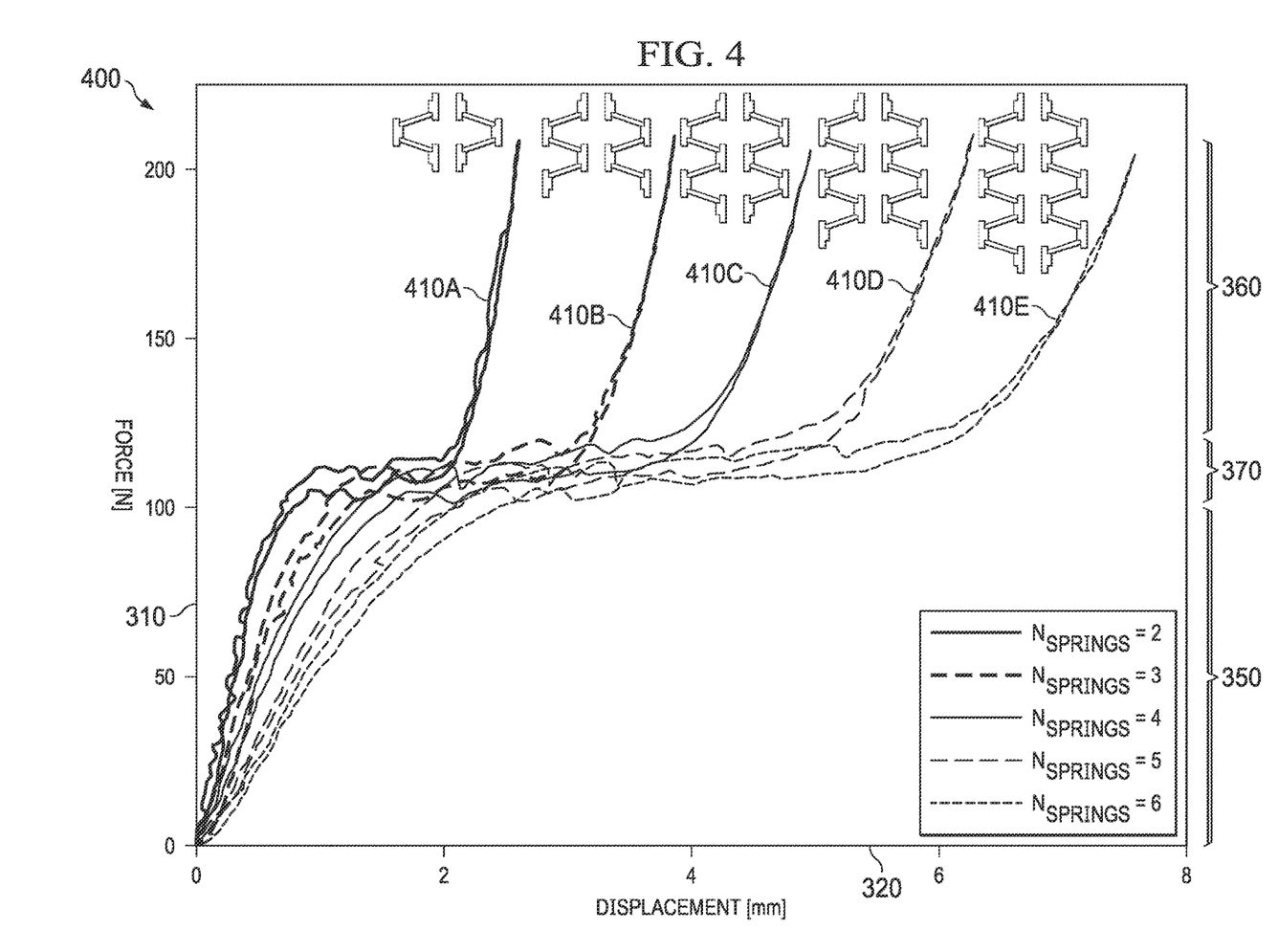
FIG. 4 is a performance graph showing the relationship between force and displacement for five different example QZS isolators, in accordance with aspects of the present disclosure.

FIG. 4 is a performance graph 400 showing the relationship between force 310 and displacement 320 for five different example QZS isolators: 410A (with two disk spring washers), 410B (with three disk spring washers), 410C (with four disk spring washers), 410D (with five disk spring washers), and 410E (with six disk soring washers), in accordance with aspects of the present disclosure. As shown in FIG. 3, the force-displacement curve for each QZS isolator includes a first approximately linear region 350, a quasi zero stiffness (QZS) region 370, and a second approximately linear region 360. As can be seen in the graph 400, the width or displacement range of the QZS region 370 (e.g. the number of millimeters of displacement permitted within the QZS region) increases with the number of disk spring washers, such that QZS isolator 410A, with two disk spring washers, has a QZS region approximately 1 mm wide, whereas QZS isolator 410E, with six disk spring washers, has a QZS region approximately 4 mm wide. Thus, QZS isolators with more disk spring washers are more capable of absorbing movement at the bottom of the isolator (e.g., movement of a vehicle floor) without transferring it to the top of the isolator (e.g., to the bottom of a vehicle seat). However, QZS isolators with more disk spring washers must be correspondingly taller, which may limit the places they will fit and the applications for which they may be used. Taller QZS isolators will also tend to cost more, as they require more materials, and they may exhibit less lateral stability and less lateral load capacity than shorter QZS isolators. Thus, taller QZS isolators may have a greater tendency to buckle under lateral loads. In this buckled state, the QZS vibration isolator may be substantially less effective at isolating vibrations, both in longitudinal and lateral directions.

Figure 5A:
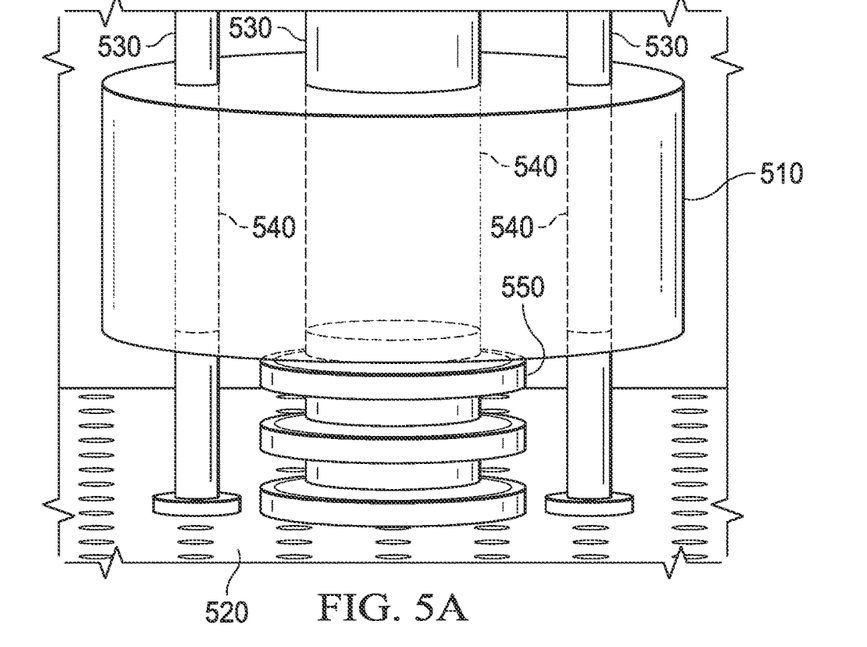
FIG. 5A is a perspective view of an example one-dimensional (1D) QZS vibration isolator measurement apparatus, in accordance with aspects of the present disclosure.

FIG. 5A is a perspective view of an example one-dimensional (1D) QZS vibration isolator measurement apparatus, in accordance with aspects of the present disclosure. Visible are a test mass 510 mounted to a shaker table 520 by a vibration isolator 550. For lateral and rotational stability during 1D vibration testing, the test mass 510 includes three tubular channels 540 through which three shafts 530 pass.

Figure 5B:
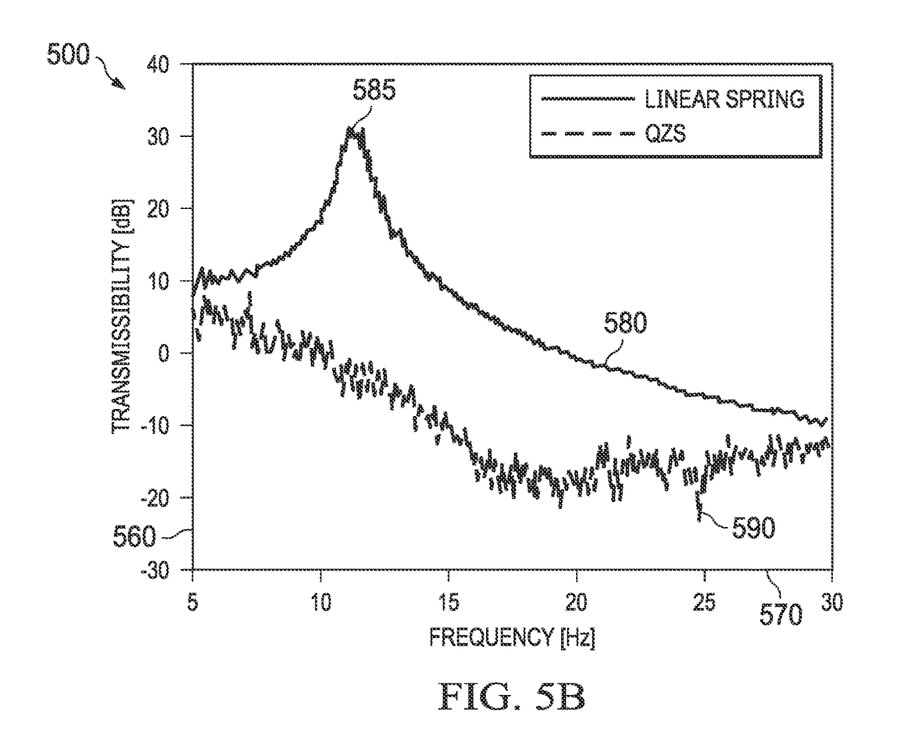
FIG. 5B is a performance graph showing the 1D vibration suppression performance of two different types of isolators, in accordance with aspects of the present disclosure.

FIG. 5B is a performance graph 500 showing the 1D vibration suppression performance of two different types of isolators in the test apparatus of FIG. 5A, in accordance with aspects of the present disclosure. The graph 500 shows curves of transmissibility 560 (measured for example in decibels or dB) vs. frequency 570 (measured for example in Hertz or Hz), for a linear spring isolator 580 and a QZS isolator 590. This represents, for example, the extent to which vertical vibrations of the shaker table 520 (See FIG. 5A) are translated into vertical vibrations of the test mass 510 (see FIG. 5A). A transmissibility of zero dB may represent perfect transmission of the vibrations through the isolator 550 (see FIG. 5A), such that a vibration of the shaker table causes an equal vibration of the test mass at that particular frequency. A transmissibility greater than 0 dB may represent amplification by the isolator, such that a vibration of the shaker table results in a larger or more powerful vibration of the test mass at that particular frequency. A transmissibility smaller than 0 dB may represent dampening of vibrations by the isolator, such that a vibration of the shaker table results in a smaller or less powerful vibration of the test mass at that particular frequency. In general, values less than 0 dB are desirable at all frequencies, and especially at higher frequencies.

As can be seen, the linear spring isolator curve 580 exhibits a sharp peak 585 at approximately 12 Hz, possibly representing a resonant frequency of the spring, and thus causing transmissibility in excess of +30 dB (e.g., 100 times more vibration than is observed at 5 Hz and 15 Hz). The linear spring isolator curve does not fall below 0 dB until the frequency of vibration exceeds 20 Hz. By contrast, the QZS isolator curve 590 does not exhibit any sharp peaks, and it drops below 0 dB at a vibration frequency of approximately 10 Hz, and remains below zero for the remainder of the curve. The QZS isolator curve 590 is also lower at all points than the linear spring isolator curve 580, indicating that the QZS isolator is better at suppressing vertical vibrations (or, alternatively, worse at transmitting such vibrations) than the linear spring isolator.

Figure 6A:
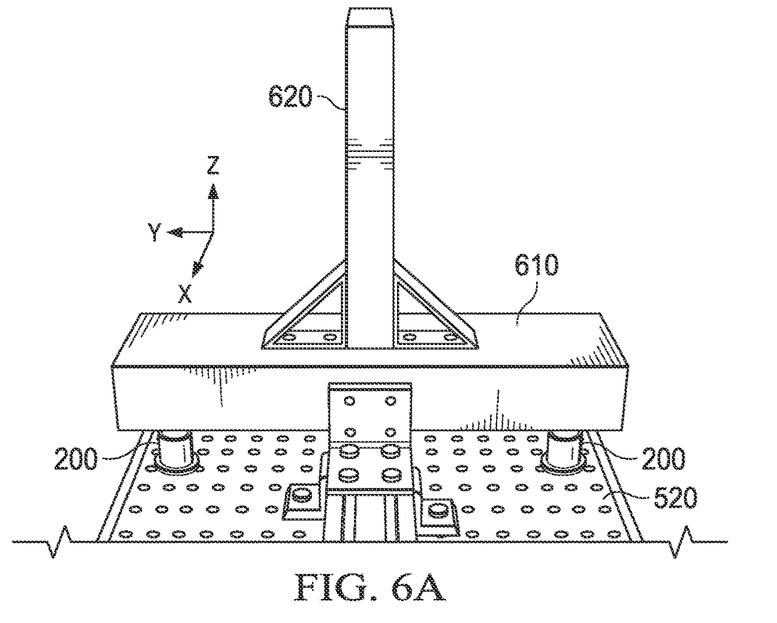
FIG. 6A is a perspective view of an example two-dimensional (2D) QZS vibration isolator measurement apparatus, in accordance with aspects of the present disclosure.

FIG. 6A is a perspective view of an example two-dimensional (2D) QZS vibration isolator measurement apparatus, in accordance with aspects of the present disclosure. Visible are a vertical test mass 620 fixedly mounted to a horizontal test mass 610, which in turn is mounted to a shaker table 520 by a pair of QZS vibration isolators 200. The effectiveness of the QZS isolators 200 may be assessed for example by measuring the vibration at the top of the vertical test mass 620, and comparing it to vibrations measured at the surface of the shaker table 520. Vibration of the shaker table 520 can result in rocking of the test masses 610 and 620, resulting in torques and lateral forces on the QZS isolators.

Figure 6B:
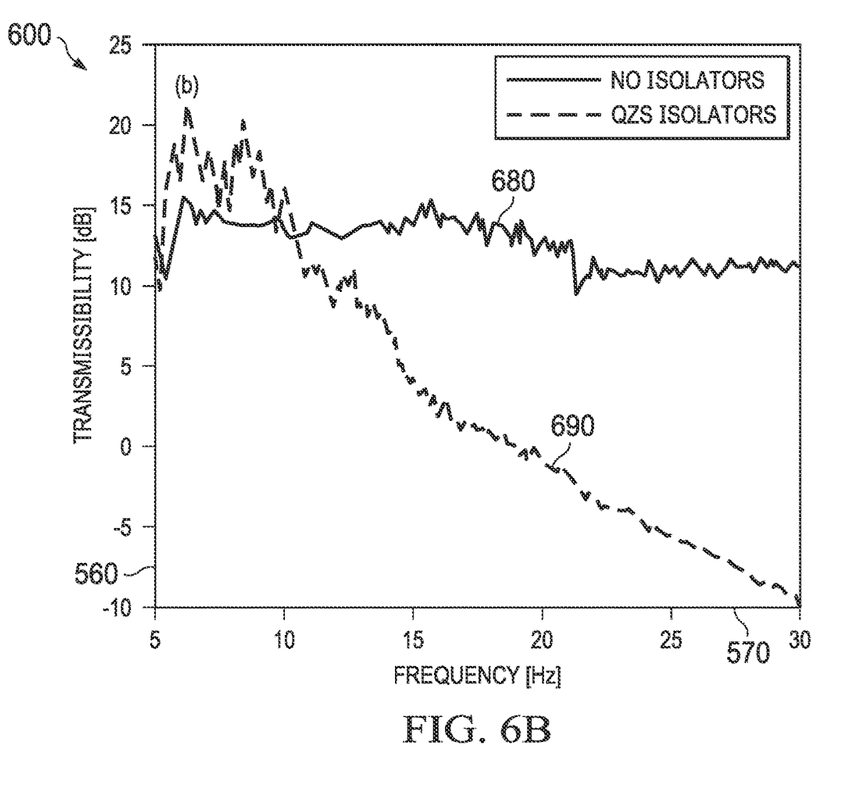
FIG. 6B is a performance graph showing the vibration suppression performance a QZS isolator, in accordance with aspects of the present disclosure.

FIG. 6B is a performance graph 600 showing the vibration suppression performance the QZS isolators in the test apparatus of FIG. 6A, in accordance with aspects of the present disclosure. The graph 600 shows curves of transmissibility 560 (measured for example in decibels or dB) vs. frequency 570 (measured for example in Hertz or Hz), for a non-isolated mass 680 and a QZS isolated mass 690. This represents, for example, the extent to which vertical vibrations of the shaker table 520 (See FIG. 6A) are translated into vertical and horizontal vibrations of the top of the vertical test mass 620 (see FIG. 6A), e.g. through lateral rocking of the lower test mass due to uneven compression of the QZS isolators 200. A transmissibility of zero dB may represent perfect transmission of the vibrations through the QZS isolators 200 (see FIG. 6A), such that a vibration of the shaker table causes an equal vibration of the top of the vertical mass at that particular frequency. A transmissibility greater than 0 dB may represent amplification by the isolators and/or the test masses, such that a vibration of the shaker table results in a larger or more powerful vibration of the top of the vertical test mass at that particular frequency. A transmissibility smaller than 0 dB may represent dampening of vibrations by the isolators, such that a vibration of the shaker table results in a smaller or less powerful vibration of the top of the vertical test mass at that particular frequency. In general, values less than 0 dB are desirable at all frequencies, and especially at higher frequencies.

As can be seen, when the test masses are mounted directly to the shaker table with no vibration isolation, as represented by curve 680, the test masses amplify the vibrations of the shaker table by 10-15 dB across all measured frequencies. The QZS-isolated curve 690 shows an even greater amplification of 15-20 dB between 5 Hz and 10 Hz. However, the amplification is less than that of curve 680 at all measured frequencies above 10 Hz, and is less than zero (indicating a net damping of vibrations) at all measured frequencies higher than 20 Hz. This demonstrates that QZS isolators are effective at reducing vibrations of a 2D shaking apparatus.

It is noted that 2D vibrations can induce lateral forces on the seat.

Figure 7:
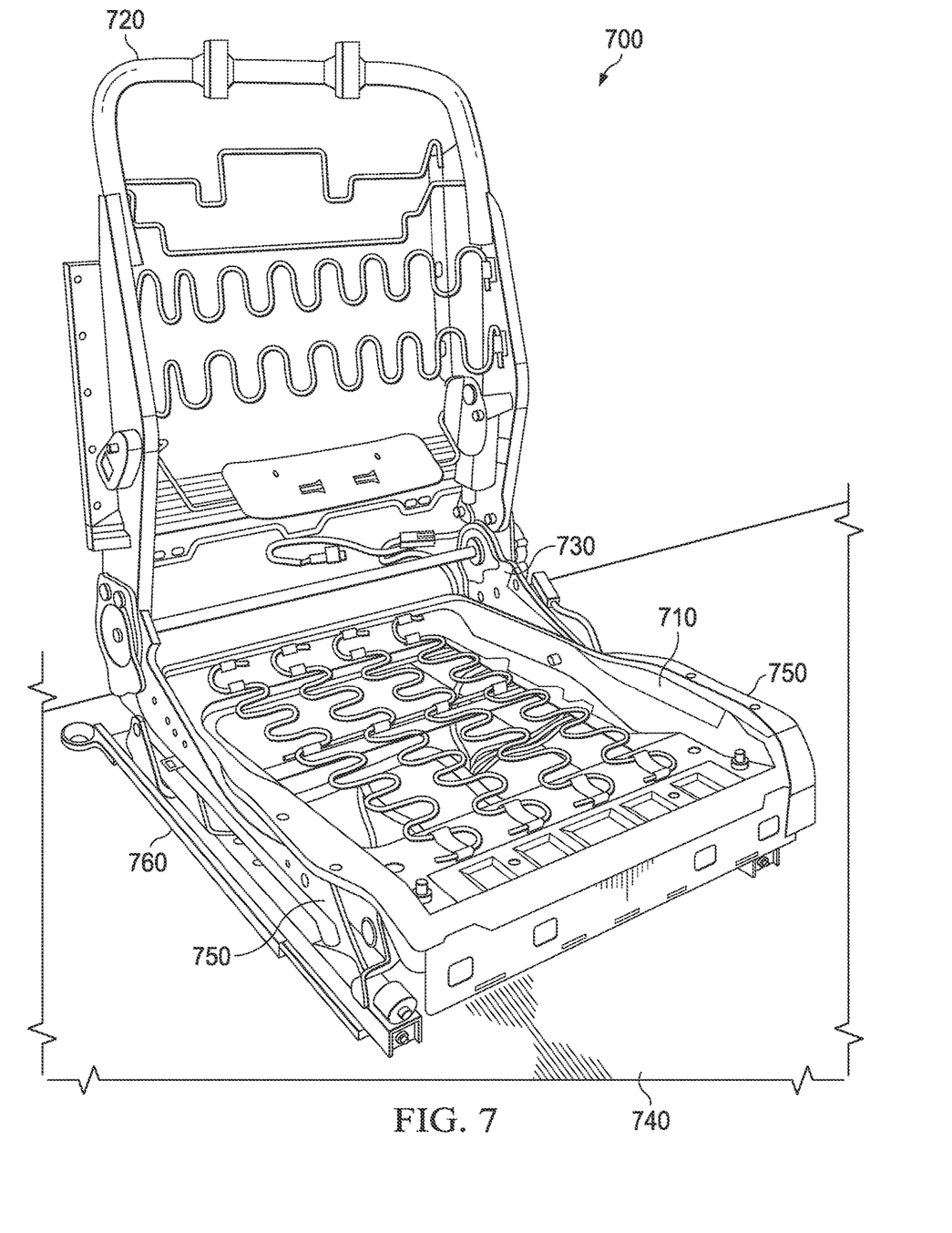
FIG. 7 is a perspective view of a vehicle seat with its wiring, cushioning, and upholstery removed, in accordance with aspects of the present disclosure.

FIG. 7 is a perspective view of a vehicle seat 700 with its wiring, cushioning, and upholstery removed, in accordance with aspects of the present disclosure. The vehicle seat 700 includes a seat pan or seat cushion pan 710, a seat back or seat back frame 720, and a recliner apparatus 730 to adjust the angle between the seat pan 710 and the seat back 720. The seat 700 also includes a seat frame 750, which attaches to the vehicle floor 740 by means of two slide rails 760, which permit the seat 700 to slide backward and forward with respect to the floor 740.

Figure 8A:
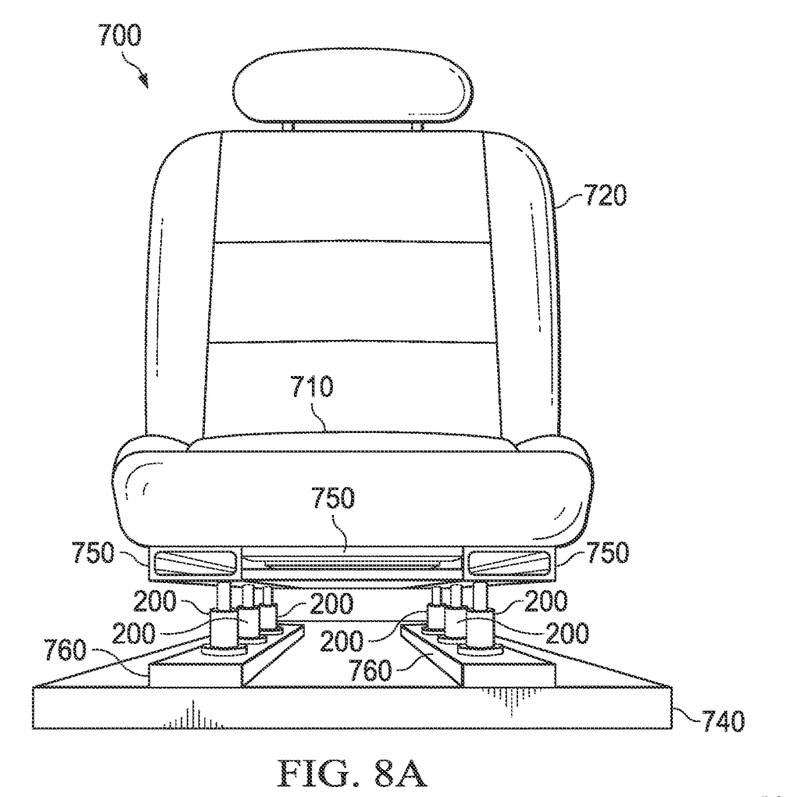
FIG. 8A is a perspective view of a vehicle seat, in accordance with aspects of the present disclosure.

FIG. 8A is a perspective view of a vehicle seat 700, in accordance with aspects of the present disclosure. The vehicle seat 700 includes a seat back 720 coupled to a seat pan 710, which is coupled to the seat frame 750. The seat frame 750 is coupled to a plurality of QZS vibration isolators 200, which are in turn coupled to the slide rails 760, which are coupled to the vehicle floor. Coupling may for example be through welds, bolts, screws, rivets, solder, adhesive, or other means known in the art. The QZS isolators 200 are configured to reduce transmission of vibration between the vehicle floor 740 and the seat 700.

Figure 8B:
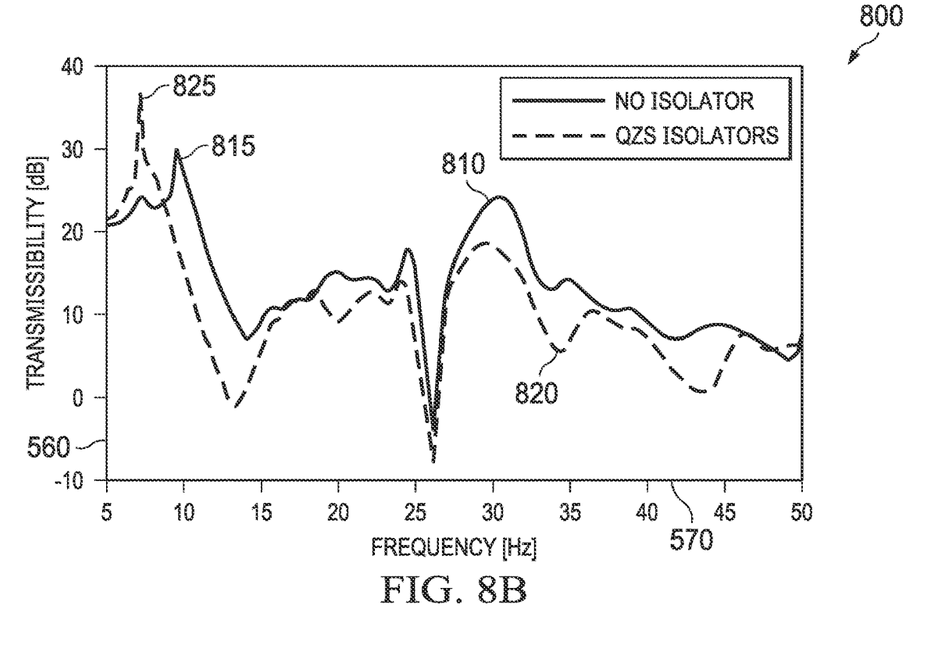
FIG. 8B is a performance graph showing the vibration suppression performance QZS isolators, in accordance with aspects of the present disclosure.

FIG. 8B is a performance graph 800 showing the vibration suppression performance of the QZS isolators 200 of FIG. 8A, in accordance with aspects of the present disclosure. The graph 800 shows curves of transmissibility 560 (measured for example in decibels or dB) vs. frequency 570 (measured for example in Hertz or Hz), for a non-isolated seat 810 and a QZS-isolated seat 820. This represents, for example, the extent to which vibrations of the floor 740 (see FIG. 8A) are translated into vibrations of the top of the seat back 720 (see FIG. 8A), e.g. through lateral rocking of the lower test mass due to uneven compression of the QZS isolators 200 (see FIG. 8A). A transmissibility of zero dB may represent perfect transmission of the vibrations through the QZS isolators 200 (see FIG. 6A), such that a vibration of the floor causes an equal vibration of the top of the seat back at that particular frequency. A transmissibility greater than 0 dB may represent amplification by the seat structure and/or the isolators, such that a vibration of the floor results in a larger or more powerful vibration of the top of the seat at that particular frequency. A transmissibility smaller than 0 dB may represent dampening of vibrations by the isolators, such that a vibration of the floor results in a smaller or less powerful vibration of the top of the seat back at that particular frequency. In general, values less than 0 dB are desirable at all frequencies, and especially at higher frequencies.

As can be seen, both the QZS-isolated curve 820 and the non-isolated curve 810 exhibit amplification spikes at low frequency. The spike 815 of the non-isolated curve 810 occurs at 10 Hz and has a maximum value of approximately 30 dB. The spike 825 of the QZS-isolated curve 820 is actually larger than the spike 815 of curve 810, indicating greater amplification of the floor's vibrations, with a peak value of roughly 37 dB. However, this spike occurs at a lower frequency—7 Hz for spike 825 vs. 10 Hz for spike 815, and may therefore result in less overall discomfort to a user sitting in the seat. Notably, the QZS-isolated curve 820 is lower than the non-isolated curve 810 at most measured frequencies between 9 Hz and 47 Hz, by as much as 10 dB (e.g., one tenth as much vibration transmission). The QZS-isolated curve 820 is approximately equal to the non-isolated curve 810 at 17 Hz and at 47-50 Hz. The total area under curve 820 is significantly less than the total area under curve 810, indicating less overall vibration transmissibility between the vehicle floor and the top of the seat back. Thus, a person of ordinary skill in the art will appreciate that QZS isolators may be effective at reducing the vibrations of a vehicle seat, and will generally result in a more comfortable ride for an occupant of the seat.

It is noted that vibrations of the vehicle floor and/or vehicle seat can induce lateral forces on the seat. As noted above, a need exists for lateral QZS isolators that are capable of reducing lateral vibration of the seat back.

Figure 9:
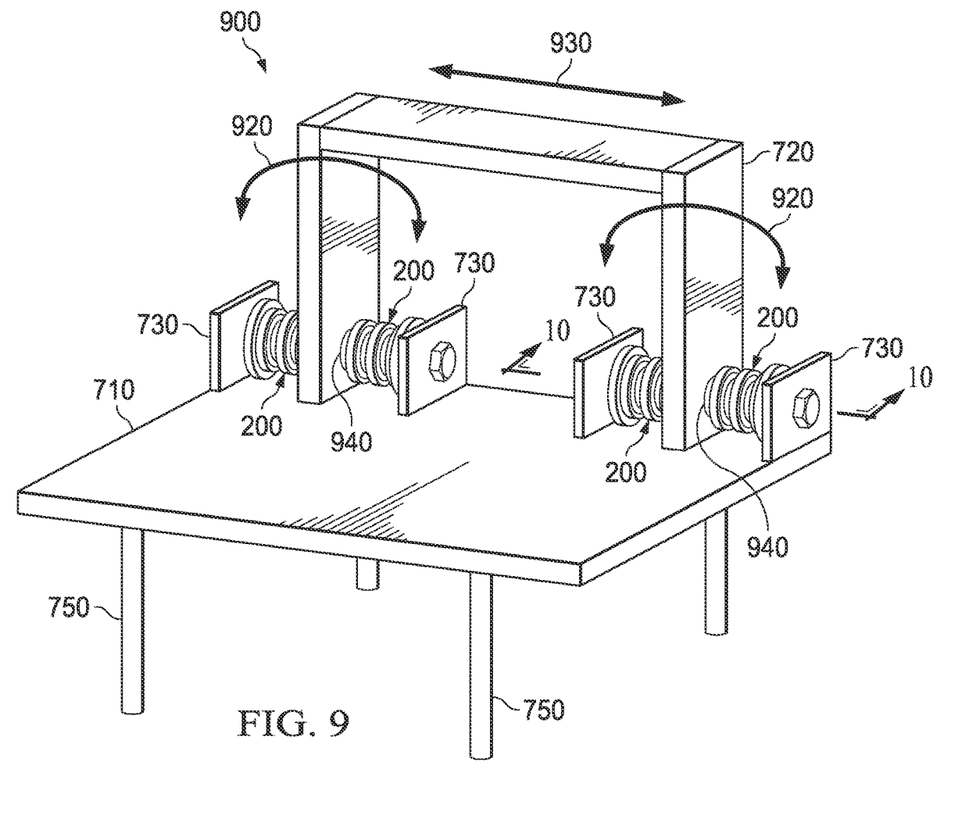
FIG. 9 is a side cross-sectional view of a seat back lateral vibration isolator mechanism, in accordance with at least one embodiment of the present disclosure.

FIG. 9 is a side cross-sectional view of a seat back lateral vibration isolator mechanism 900, in accordance with at least one embodiment of the present disclosure. The seat back or seat back frame 720 is subjected to lateral vibration forces 930 that are transmitted through the attachment points 940 near the bottom of the seat back 720 and into the seat back 720 itself. Because the seat back forms a lever arm or inverted pendulum, vibrational motions near the bottom of the seat back may result in larger vibrational motions near the top of the seat back. Such lateral vibrations (e.g. vibrations occurring along a lateral or left-right axis of the vehicle or the vehicle seat) may also occur unevenly, such that the seat back 720 takes on a lateral rocking motion that creates torque forces 920.

A spring stack or QZS vibration isolator 200 may be mounted on each side of a portion of an attachment point 940 of the seat back 720, where it connects to the seat pan 710 or the seat frame 750. Each spring stack or QZS isolator 200 may be positioned between the portion of the seat back and the attachment point 940 of the seat pan 710 or seat frame 750. Thus, the attachment points 940, where the seat back 720 connects to the seat pan 710 or seat frame 750, is supported between the spring stacks 200 on either side.

Because the seat back 720 contacts the seat pan 710 and/or the seat frame 750 at the attachment points 940, vibration from the seat pan 710 and/or seat frame 750 is transmitted through the attachment points 940. Therefore, mounting the spring stacks or vibration isolators 200 on either side of the attachment points 940 helps to isolate the seat back 720 from lateral vibration forces 930 and torque forces 920 transmitted between the seat pan 710 or seat frame 750 and the seat back 720.

Although a total of four springs stacks or QZS vibration isolators 200 are shown in FIG. 9, a person of ordinary skill in the art will appreciate that the seat back 720 may be attached to the seat pan 710 and/or seat frame 750 by other arrangements and other numbers of spring stacks or QZS isolators 200, including one, two, three, five, six or more spring stacks or QZS isolators 200.

Figure 10:
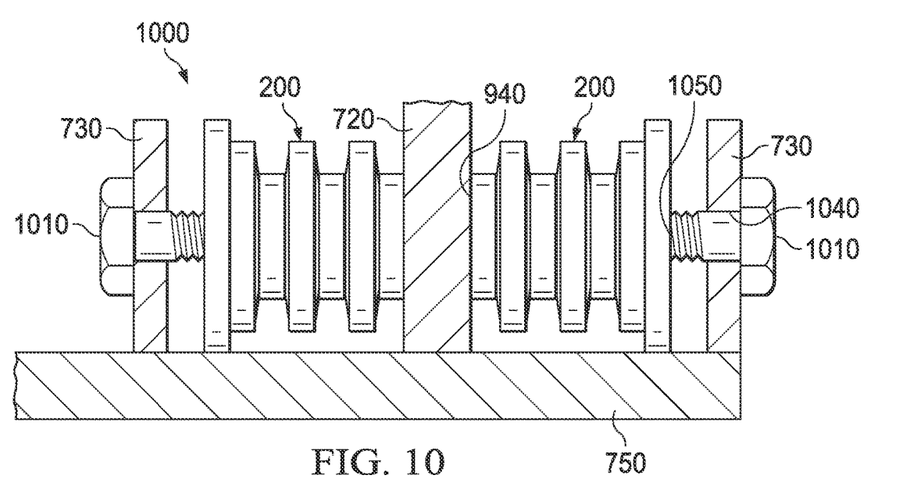
FIG. 10 is a front view of a vehicle seat back lateral vibration isolator mechanism, in accordance with at least one embodiment of the present disclosure.

FIG. 10 is a front view of a vehicle seat back lateral vibration isolator mechanism 1000, in accordance with at least one embodiment of the present disclosure. In the non-limiting example shown in FIG. 10, a portion of the seat back frame 720 is attached to the seat frame 750 by two bolts 1010. Each bolt 1010 is threaded through at attachment point 1040 in the seat frame 750 to an attachment point 1050 on a spring stack or QZS vibration isolator 200. The spring stack or isolator is then coupled to an attachment point 940 on the seat back frame 720. Such coupling may be by means of a screw, weld, pin, rivet, additional bolt, or other means known in the art.

To compress the spring stack or QZS vibration isolator 200 with a pre-load force, the bolt 1010 may engage with a complementary threaded element of the attachment point 1050 of the spring stack or QZS vibration isolator 200. Rotation of the bolt 1010 may axially compress or uncompress the spring stack or QZS vibration isolator 200, depending on the direction of rotation. Each spring stack or QZS vibration isolator may be preloaded using its respective bolt to a point where the stack provides the quasi-zero/negative stiffness response even when no external vibration forces are applied to it. Thus, when vibration forces are applied, they encounter the spring stack or QZS isolator 200 in its QZS region, where vibration isolation is most effective.

Figure 11:
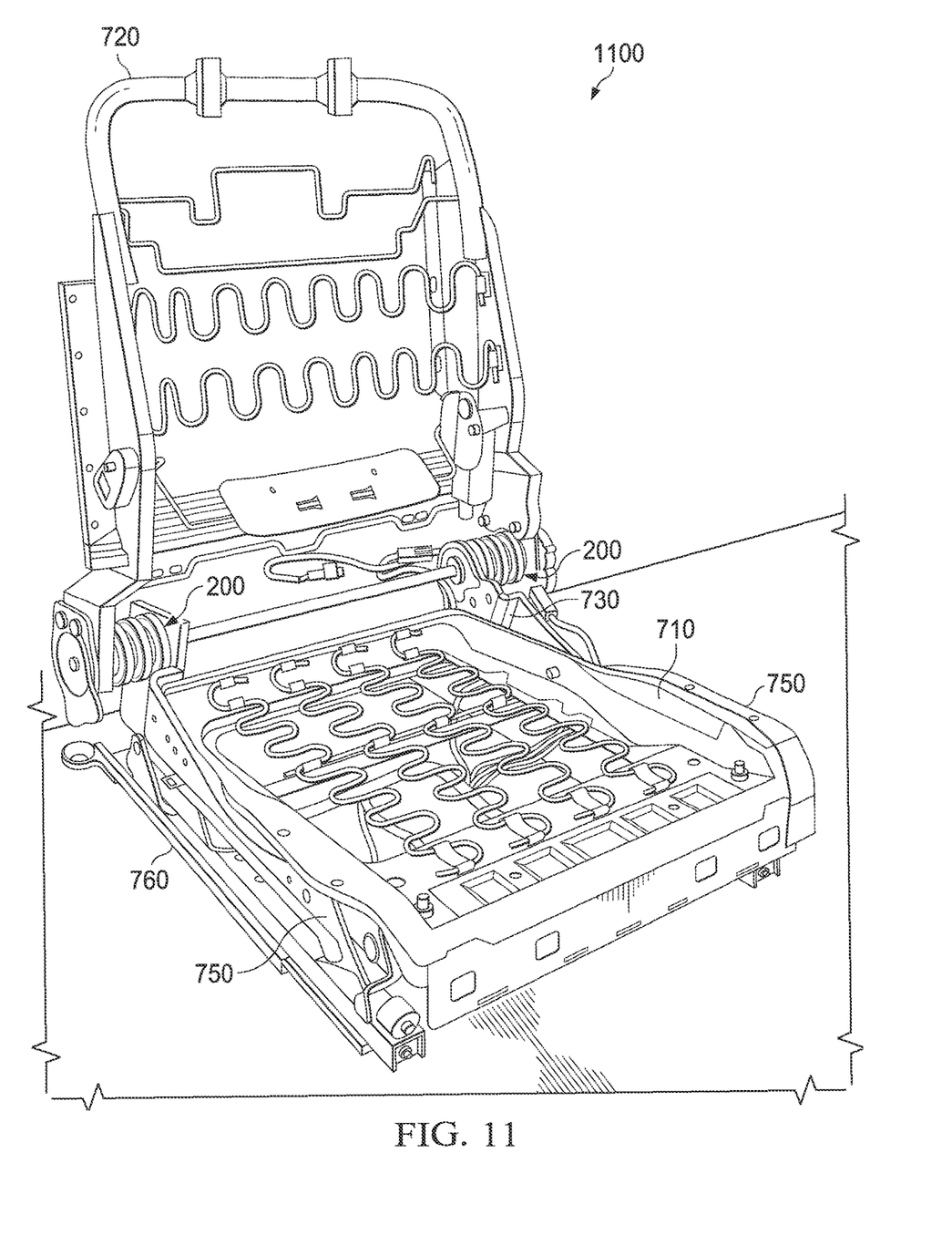
FIG. 11 is a perspective view of a vehicle seat back lateral vibration isolator mechanism, in accordance with at least one embodiment of the present disclosure.

FIG. 11 is a perspective view of a vehicle seat back lateral vibration isolator mechanism 1100, in accordance with at least one embodiment of the present disclosure. As with FIG. 7, FIG. 11 shows a vehicle seat including a seat pan or seat cushion pan 710, seat back 720, recliner mechanism 730, seat frame 750, and slide rails 760. In this embodiment, the recliner mechanism 730 is a motorized axle connecting the seat frame 750 to the seat back 720. Rotation of the recliner mechanism 730 causes the seat back to recline or raise, depending on the direction of rotation. Since the power recliner serves as the connection between the seat frame 750 and the seat back 720 in this embodiment, a single spring stack or QZS isolator 200 is placed on each side of the recliner mechanism 730, such that the seat back 720 is able to raise and recline normally, but the seat frame 750 is connected to the seat back 720 only through the spring stacks 200. In some embodiments, the spring stacks 200 are fixedly coupled to the seat back 720 and recliner mechanism 730, and rotationally coupled to the seat frame 750, such that the spring stacks 200 rotate along with the recliner mechanism as the seat reclines or raises. In other embodiments, the spring stacks are fixedly coupled to the seat frame 750 and rotationally coupled to the recliner mechanism 730 and/or the seat back, such that the spring stacks 200 do not rotate as the seat back 720 reclines and raises. In still other embodiments, the spring stacks 200 are able to rotate freely and independently of both the seat back 720 and the seat frame 750 or seat pan 710.

Either or both of the fixed or rotational couplings may include a bolt. Either or both bolts may be threaded into threaded connection portions on the spring stack 200 such that adjustment of the bolt adjusts a pre-load force on the spring stack 200 as described above.

As will be readily appreciated by those having ordinary skill in the art after becoming familiar with the teachings herein, the lateral vibration isolator of the present disclosure advantageously provides a capability to isolate or dampen lateral vibrations of vehicle seat backs. It should be noted that the examples described above are provided for purposes of illustration, and are not intended to be limiting. Other devices and/or device configurations may be utilized to carry out the operations described herein. A number of variations are possible on the examples and embodiments described above. Depending on the implementation, the positions or orientations may be different than shown herein. For example, although components of the QZS vibration isolator may be shown or described herein as circular, conical, or cylindrical, other shapes with non-circular (e.g., elliptical, polygonal, etc.) cross-sections may be used instead or in addition, for one or more components. The technology described herein may be used in vehicles of other types, including campers, mobile homes, commercial towing vehicles, motorcycles, off-road vehicles, aircraft, and watercraft. The exact configuration of the QZS vibration isolator may be selected to optimize performance for the vibration frequencies and amplitudes expected for such vehicles. The QZS isolator may be used for lateral vibration isolation between fixed vehicle components and other vehicle components, including but not limited to seats, engines, engine components, batteries, cargo holds, cargo platforms, wheels, bumpers, and luggage racks.

Accordingly, the logical operations making up the embodiments of the technology described herein are referred to variously as operations, steps, objects, elements, components, or modules. Furthermore, it should be understood that these may be arranged or performed in any order, unless explicitly claimed otherwise or a specific order is inherently necessitated by the claim language.

All directional references e.g., upper, lower, inner, outer, upward, downward, left, right, lateral, medial, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the lateral vibration isolator. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the lateral vibration isolator as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle seat comprising:
   a first seat component;
   a second seat component rotatably coupled to the first seat component by a rotatable coupling; and
   a laterally oriented vibration isolator positioned between the first seat component and the second seat component at the rotatable coupling, such that transmission of vibration from the first seat component to the second seat component through the rotatable coupling is suppressed.

2. The vehicle seat of claim 1, wherein the first seat component is a seat pan or seat frame.

3. The vehicle seat of claim 1, wherein the second seat component is a seat back.

4. The vehicle seat of claim 1, wherein the laterally oriented vibration isolator is a quasi-zero-stiffness (QZS) vibration isolator.

5. The vehicle seat of claim 1, wherein the laterally oriented vibration isolator is rotatably coupled to the first seat component or the second seat component.

6. The vehicle seat of claim 1, further comprising a bolt coupling the laterally oriented vibration isolator to the first seat component or the second seat component,
   wherein the laterally oriented vibration isolator further comprises a threaded connection portion through which at least a portion of the bolt is threaded, and
   wherein rotation of the bolt through the threaded connection portion compresses or uncompresses the laterally oriented vibration isolator, thereby increasing or decreasing a pre-load force on the laterally oriented vibration isolator.

7. The vehicle seat of claim 6, wherein the pre-load force or degree of compression is selected such that the laterally oriented vibration isolator is in a quasi-zero-stiffness range.

8. The vehicle seat of claim 1, wherein the laterally oriented vibration isolator is a first laterally oriented vibration isolator, and wherein the vehicle seat further comprises a second laterally oriented vibration isolator positioned between the first seat component and the second seat component at the rotatable coupling.

9. The vehicle seat of claim 1, wherein the laterally oriented vibration isolator is a first laterally oriented vibration isolator, wherein the rotatable coupling is a first rotatable coupling, and wherein the vehicle seat further comprises a second rotatable coupling between the first seat component and the second seat component, wherein a second laterally oriented vibration isolator is positioned between the first seat component and the second seat component at the second rotatable coupling, such that transmission of lateral vibration from the first seat component to the second seat component through the second rotational coupling is suppressed.

10. The vehicle seat of claim 9, further comprising:
a third laterally oriented vibration isolator positioned between the first seat component and the second seat component at the first rotatable coupling; and
a fourth laterally oriented vibration isolator positioned between the first seat component and the second seat component at the second rotatable coupling.

11. A vehicle, comprising:
a vehicle seat comprising;
a seat base, wherein the seat base comprises a seat pan or a seat frame;
a seat frame;
a seat back rotatably coupled to the seat pan or the seat frame by a rotatable coupling; and
a vibration isolator positioned between the seat base and the seat back at the rotatable coupling, such that transmission of vibration from the seat base to the seat back through the rotatable coupling is suppressed.

12. The vehicle of claim 11, wherein the vibration isolator is a quasi-zero-stiffness (QZS) vibration isolator.

13. The vehicle of claim 11, further comprising a bolt coupling the vibration isolator to the seat base or the seat back,
wherein the vibration isolator is a quasi-zero-stiffness (QZS) vibration isolator,
wherein the vibration isolator further comprises a threaded connection portion through which at least a portion of the bolt is threaded, and
wherein rotation of the bolt through the threaded connection portion compresses or uncompresses the vibration isolator, thereby increasing or decreasing a pre-load force on the vibration isolator.

14. The vehicle of claim 13, wherein the pre-load force or compression is selected such that the vibration isolator is in a quasi-zero-stiffness range.

15. The vehicle of claim 11, wherein the vibration isolator is a first vibration isolator, and wherein the vehicle seat further comprises a second vibration isolator positioned between the seat base and the seat back at the rotatable coupling.

16. The vehicle of claim 11, wherein the vibration isolator is a first vibration isolator, and wherein the vehicle seat further comprises a second rotatable coupling between the seat base and the seat back, wherein a second vibration isolator is positioned between the seat base and the seat back at the second rotatable coupling, such that transmission of vibration from the seat base to the seat back through the second rotational coupling is suppressed.

17. The vehicle of claim 16, further comprising:
a third vibration isolator positioned between the seat base and the seat back at the first rotatable coupling; and
a fourth vibration isolator positioned between the seat base and the seat back at the second rotatable coupling.

18. A system comprising:
a vehicle;
a seat comprising;
a seat base, wherein the seat base comprises a seat pan or a seat frame;
a seat frame;
a seat back rotatably coupled to the seat pan or the seat frame by a rotatable coupling;
a laterally oriented quasi-zero-stability vibration isolator positioned between the seat base and the seat back at the rotatable coupling; and
a bolt coupling the vibration isolator to the seat base or the seat back,
wherein the vibration isolator further comprises a threaded connection portion through which at least a portion of the bolt is threaded, and
wherein rotation of the bolt through the threaded connection portion compresses or uncompresses the vibration isolator, thereby increasing or decreasing a pre-load force on the laterally oriented vibration isolator.

* * * * *